United States Patent
Yamamoto et al.

(10) Patent No.: US 10,257,087 B2
(45) Date of Patent: Apr. 9, 2019

(54) COMMUNICATION DEVICE AND COMMUNICATION METHOD

(71) Applicant: ALAXALA Networks Corporation, Kawasaki-shi, Kanagawa (JP)

(72) Inventors: Yasunori Yamamoto, Kawasaki (JP); Motohide Noumi, Kawasaki (JP); Kohei Oka, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 0 days.

(21) Appl. No.: 15/495,060

(22) Filed: Apr. 24, 2017

(65) Prior Publication Data

US 2017/0339055 A1    Nov. 23, 2017

(30) Foreign Application Priority Data

May 19, 2016    (JP) ................................. 2016-100061

(51) Int. Cl.
*H04L 12/715* (2013.01)
*H04L 12/805* (2013.01)
*H04L 12/46* (2006.01)

(52) U.S. Cl.
CPC .............. *H04L 45/64* (2013.01); *H04L 47/36* (2013.01); *H04L 12/4633* (2013.01)

(58) Field of Classification Search
CPC ..... H04L 45/64; H04L 47/36; H04L 12/4633; H04L 45/28
See application file for complete search history.

(56) References Cited

U.S. PATENT DOCUMENTS

| | | | | |
|---|---|---|---|---|
| 2005/0228885 | A1* | 10/2005 | Winfield | H04L 41/0823 709/226 |
| 2007/0076618 | A1* | 4/2007 | Hirose | H04L 47/10 370/249 |
| 2009/0185572 | A1* | 7/2009 | Yasuma | H04L 12/4625 370/401 |
| 2014/0003424 | A1* | 1/2014 | Matsuhira | H04L 47/365 370/389 |
| 2015/0023146 | A1* | 1/2015 | Suzuki | H04L 45/28 370/216 |
| 2015/0188833 | A1* | 7/2015 | Fusco | H04L 47/36 718/1 |

FOREIGN PATENT DOCUMENTS

| | | |
|---|---|---|
| JP | 2015-533045 A | 11/2015 |
| WO | 2014/050091 A1 | 4/2014 |

\* cited by examiner

*Primary Examiner* — Lan-Huong Truong
(74) *Attorney, Agent, or Firm* — Mattingly & Malur, PC (57) ABSTRACT

Provided is a communication device in which communication between hosts of a layer 2 network is overlaid on a layer 3 network. The communication device manages a first MTU length of each communication path with respect to a plurality of communication paths in the layer 3 network, determines a second MTU length based on information to be added in cases where communication between the hosts of the layer 2 network is overlaid via the plurality of communication paths, and notifies the hosts of the second MTU length.

6 Claims, 7 Drawing Sheets

230 PACKET EDITING RESULT LOG

| No. | DATE AND TIME 600 | PACKET LENGTH 610 | ENCAPSULATION HEADER LENGTH 620 | MTU LENGTH 630 | SOURCE IP ADDRESS 640 | DESTINATION IP ADDRESS 650 | Next-Hop MTU LENGTH 660 |
|---|---|---|---|---|---|---|---|
| 1 | 2016/4/28 12:00:00 | 1500 | 50 | 1500 | 192.168.10.10 | 192.168.10.20 | 1450 |
| 2 | 2016/4/28 13:10:20 | 1500 | 50 | 1300 | 192.168.10.10 | 192.168.10.30 | 1250 |

FIG. 7

250
MTU MANAGEMENT TABLE

| No. | DESTINATION IP ADDRESS (710) | MTU LENGTH (720) |
|---|---|---|
| 1 | 192.168.10.20 | 1500 |
| 2 | 192.168.10.30 | 1300 |

FIG. 8

260
MAC ADDRESS TABLE

| No. (800) | MAC ADDRESS (810) | L3 NETWORK SIDE IP ADDRESS (820) | HOST SIDE PORT NUMBER (830) | HOST SIDE VLAN ID |
|---|---|---|---|---|
| 1 | 00-00-00-00-00-10 | – | IF10 | 100 |
| 2 | 00-00-00-00-00-20 | 192.168.10.20 | – | – |

COMMUNICATION DEVICE AND COMMUNICATION METHOD

BACKGROUND OF THE INVENTION

The present invention relates to a communication device and a communication method, and more particularly, to a communication device and a communication method in which a layer 2 network is overlaid on a layer 3 network.

In recent years, demands for infrastructure for accommodating a plurality of tenants (user organizations and their systems) on a large scale and efficiently in data centers and the like have been increasing due to consolidation and integration of servers by network virtualization, cloud computing, and the like. One method of providing infrastructure for accommodating the plurality of tenants on a large scale and efficiently is an overlay method for constructing a logical layer 2 network on an existing layer 3 network. The overlay method performs tunnel communication between virtual switches to encapsulate a layer 2 Ethernet (registered trademark) frame in a layer 3 IP packet. Such an overlay method includes VXLAN (Virtual Extensible VLAN), GRE (Generic Routing Encapsulation), and the like.

WO2014/050091 (JP2015-533045A) discloses a technique of a communication system for distinguishing and managing a network for each user such as an enterprise, a group or the like by a virtual network such as an overlay. When using a virtual network such as an overlay, performance bottleneck can be improved by adjusting the number of packets to be encapsulated by adjusting an MTU (Maximum Transmission Unit) of the packet. However, every time the computing unit is connected to a VPN (Virtual Private Network), the network connection device inquires a network control device about the MTU corresponding to the VPN. Therefore, the bottleneck caused by the MTU inquiry becomes an issue.

It is an object of WO2014/050091 (JP2015-533045A) to reduce the performance bottleneck, and techniques have been disclosed in which, in a communication system including a computing unit that transmits communication data with a plurality of packets and a communication unit that performs packet processing for transmitting the packets via a virtual network, the computing unit adjusts a size of a transmission packet with a packet size selected from a plurality of packet size candidates based on information regarding a forwarding path of the transmission packet transmitted to the communication unit.

SUMMARY OF THE INVENTION

An object of the invention disclosed in WO2014/050091 (JP2015-533045A) is to reduce the number of inquiry of the MTU made by the computing unit every time it connects to the VPN (Virtual Private Network), and it is not an object of the above invention to suppress a fragment.

For example, in cases where a layer 2 network which performs communication by an Ethernet (registered trademark) frame is overlaid on a layer 3 network, typically, when encapsulation processing is performed in a virtual switch, encapsulation header information for tunnel is added to the Ethernet (registered trademark) frame transmitted from the host. Therefore, even when the frame which the host transmits does not exceed the MTU length of the communication path set in the host, since the header information is added in the virtual switch, the MTU length of the communication path is exceeded. Thus, fragment of the packet may occur in the virtual switch. The fragment is to transmit the original packet by dividing it so that the original packet can fit within the MTU, which is the packet length that can be transmitted at one time on a network, when the original packet exceeds the MTU.

In this way, when the host, without learning that the encapsulation header information for tunnel is added in a communication device such as virtual switches, transmits the frame of MTU length of the communication path, every time such frame is received, the communication device has to perform fragment processing for the frame after the header information is added, and thus frequently repeats division and reconstruction of the packet in the communication device. Therefore, the processing load of the communication device may increase and the performance of the communication device may deteriorate. In addition, since the packet is divided, the packet forwarding efficiency may decrease due to an increase in the number of packets. Also, in cases where any of the divided packets is damaged, the reconstruction of the packet cannot be made. Furthermore, in the case of prohibition of packet division (DF (Don't Fragment) bit in the packet is valid), fragment processing cannot be performed in the communication device, and packet forwarding cannot be performed. However, when the layer 2 network is overlaid on the layer 3 network, since there is no way for the hosts to determine that the packet cannot be sent because the packet exceeds the MTU as encapsulation header information is added in a communication device, the hosts cannot determine the reason why the frame does not reach the other side although transmitting the frame repeatedly.

In order to avoid such a problem, a construction method may be provided in which the MTU is set in advance assuming various cases for all communication paths of the communication device at the time of construction of the network environment. However, this method complicates the construction of the network, which makes the construction difficult.

There may be provided another method of avoiding fragment in which the MTU on the layer 3 network is increased. However, in the case of public networks, changing the MTU is risky. In addition, in a general Ethernet (registered trademark) environment, a communication device in the layer 2 network might be required to support jumbo frames.

On the other hand, when the MTU on the layer 3 network is not changed and the packet length is decreased so as not to exceed the MTU, the burden on the network administrator/user will increase because the network administrator/user has to manage the MTU for each communication path since the MTU differs for each communication path.

In view of the problems residing in the prior art, an object of the present invention is to prevent fragments in the communication device without increasing the burden on a network administrator/user in cases where a layer 2 network is overlaid on a layer 3 network.

In order to solve the above problems, the present invention provides, for example, a communication device in which communication between hosts of a layer 2 network is overlaid on a layer 3 network. The communication device manages the first MTU length for each communication path with respect to a plurality of communication paths in the layer 3 network, determines the second MTU length based on information to be added in cases where communication between hosts of the layer 2 network is overlaid on the layer 3 network via a plurality of communication paths, and notifies the hosts of the second MTU length which has been determined.

Further, in cases where, in the communication device, a packet length after adding the information to be added to a packet received from the hosts exceeds the first MTU length, the communication device notifies the hosts which have transmitted the packet of the second MTU length.

Further, more specifically, the communication device notifies the hosts of the second MTU length such that the second MTU length includes the message created based on the format of the ICMP (Internet Control Message Protocol).

The second MTU length is a value obtained by subtracting the information to be added from the first MTU length.

According to the present invention, when the layer 2 network is overlaid on the layer 3 network, it is possible to prevent fragments in the communication device without increasing the burden on the network administrator/user.

Other objects, features and advantages of the invention will become apparent from the following description of the embodiments of the invention taken in conjunction with the accompanying drawings.

DESCRIPTION OF THE EMBODIMENTS

Hereinafter, embodiments of the present invention will be described with reference to FIGS. 1 to 6. Note that the same reference numerals are given to substantially the same portions, and the description will not be repeated.

Figure 1:
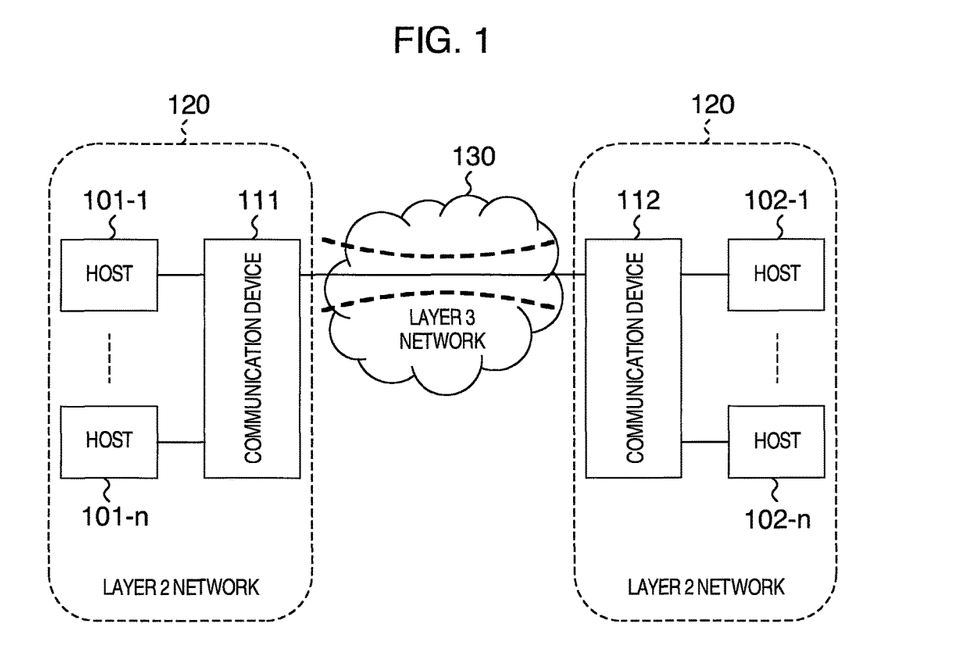
FIG. 1 is a diagram illustrating a configuration of a communication network in which a layer 2 network is overlaid on a layer 3 network.

FIG. 1 is a diagram for explaining a configuration of a communication network in which a layer 2 network is overlaid on a layer 3 network.

A configuration in which the layer 2 network is overlaid on the layer 3 network will be described with reference to FIG. 1.

FIG. 1 shows a communication network in which the layer 2 network 120 is overlaid on the layer 3 network 130. Since a host 101-1 to a host 101-n, and a communication device 111 of the layer 2 network is overlaid on the layer 3 network, they are connected to the layer 2 network having a communication device 112, and a host 102-1 to a host 102-n.

The hosts 101 and the communication device 111 are connected, and the hosts 102 and the communication device 112 are connected and they belong to the layer 2 network 120. The communication device 111 is connected to the communication device 112, which is the transmission destination via the layer 3 network 130.

The hosts 101 and the hosts 102 are computer devices, such as PCs (personal computers), which communicate with the communication device 111 and the communication device 112, respectively. The communication device 111 is a gateway device such as a virtual switch to the layer 3 network 130. The communication device 111 and the communication device 112 forward the frame received from the hosts 101 and 102 via the layer 3 network 130 to the communication device 112 as the transmission destination. The communication devices 111 and 112, when through the layer 3 network 130, perform tunnel communication using the overlay method.

Figure 2:
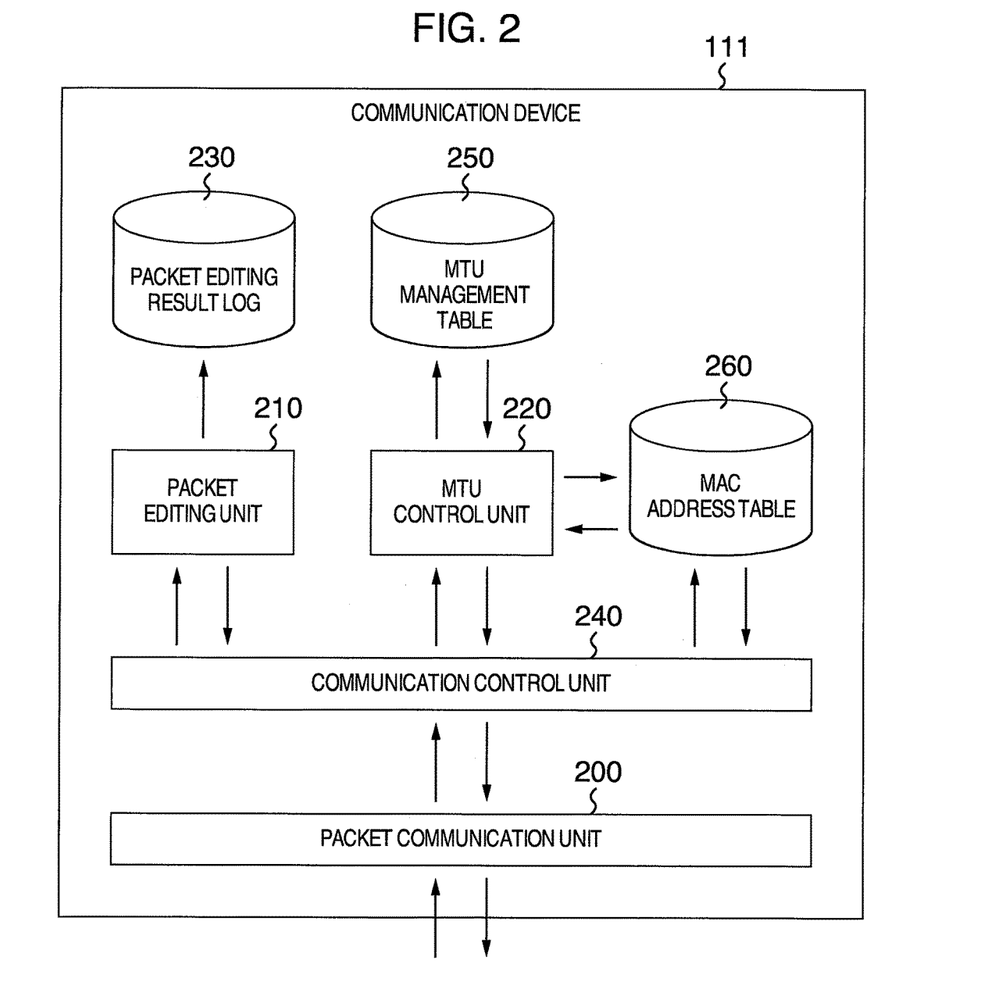
FIG. 2 is a diagram illustrating a configuration of a communication device according to one embodiment of the present invention.

FIG. 2 is a diagram for explaining a configuration of a communication device according to one embodiment of the present invention.

With reference to FIG. 2, the configuration of the communication device 111 will be described. The communication device 112 in FIG. 1 has a similar configuration to the communication device 111.

The communication device 111 includes a packet communication unit 200, a communication control unit 240, a packet editing unit 210, an MTU management unit 220, an MTU management table 250, an MAC address table 260 and a packet editing result log 230.

The packet communication unit 200 performs packet transmission and reception.

The communication control unit 240 performs a control related to communication, for example, a control corresponding to control of the basic operation of switches and routers. The communication control unit 240 creates and updates the MAC address table 260 when a packet is transmitted and received.

Figure 8:
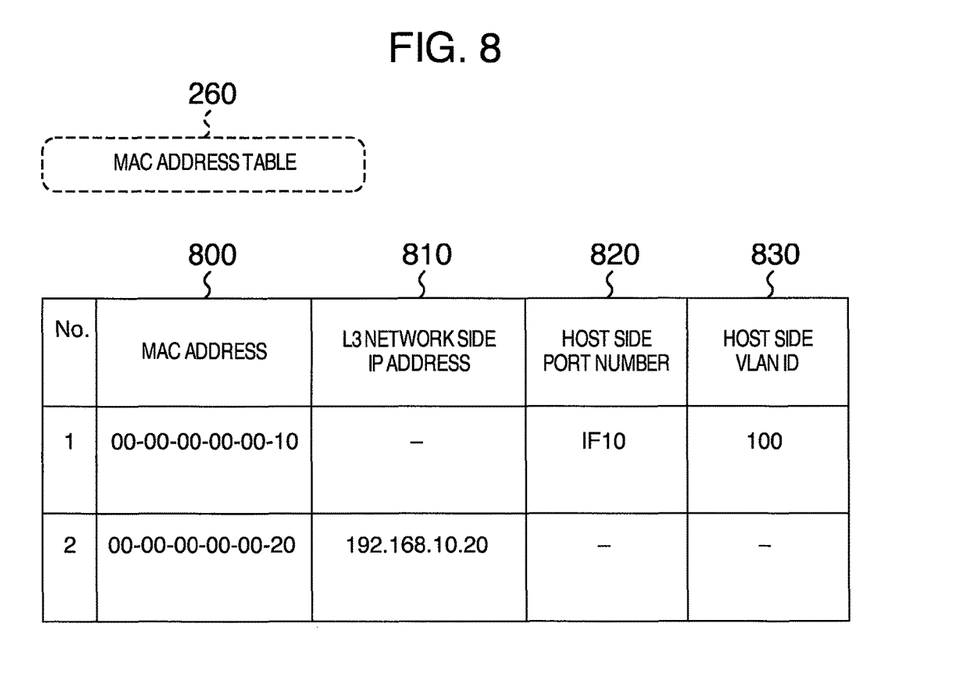
FIG. 8 is a diagram showing an MAC address table according to one embodiment of the present invention.

FIG. 8 shows the MAC address table according to one embodiment of the present invention.

As shown in FIG. 8, the MAC address table 260 includes an MAC address 800, an L3 network side IP address 810, a host side port number 820, and a host side VLAN ID 830. The MAC address table 260 is a table referred to when creating the MTU management table 250.

Returning to FIG. 2, the packet editing unit 210 performs content reference, and editing of the packet which the packet communication unit 200 has received. In addition, when encapsulating the packet, the packet editing unit 210 adds and deletes header information based on an overlay method applied. In addition, when the packet length exceeds the MTU length of the target path, the packet editing unit 210 creates an error message based on the ICMP protocol (Internet Control Message Protocol) format and performs transmission, and performs processing of registering the content of the transmitted error message, which has been transmitted, to the Packet editing result log 230.

The MTU management unit 220 creates and updates the MTU management table 250 for managing the MTU length of the target path for each communication path and calculates the MTU length for each communication path managed by the MTU management table 250, and the MTU length to be satisfied by the received packet based on the header length added to the packet in the packet editing unit 210 (MTU length to be satisfied by the transmission packet from the hosts 101 and 102).

Figure 7:
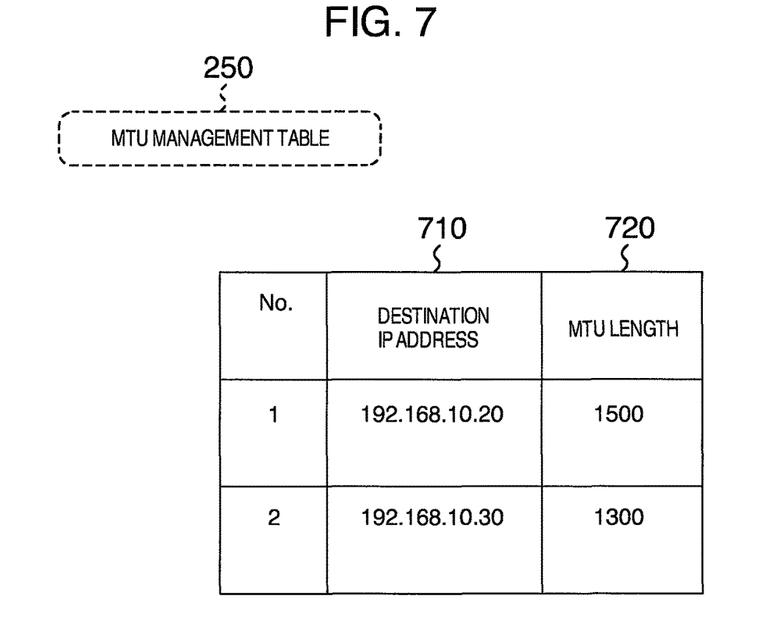
FIG. 7 is a diagram showing an MTU management table according to one embodiment of the present invention.

FIG. 7 shows a structure of the MTU management table in one embodiment of the present invention.

The structure of the MTU management table 250 is shown in FIG. 7. The destination IP address 710 retrieves the corresponding MAC address 800 from the MAC address table 260 using the destination MAC address stored in the packet, extracts the L3 network side IP address 810 corresponding to the MAC address 800, and registers it in the destination IP address 710. The MTU length of the target path is registered in the MTU length 720. A conventional technique for examining the minimum MTU on the communication path includes the Path MTU Discovery (RFC 1191) (hereinafter referred to as PMTUD). The MTU management unit 220 updates the MTU length 720 when there is a notification of the MTU length by the PMTUD regarding the MTU length of the target path. Moreover, MTU management unit 220 compares the packet length obtained by adding the header length to be added in the packet editing unit 210 to the packet length received via the packet communication unit 200 with the MTU length of the target path.

Figure 3:
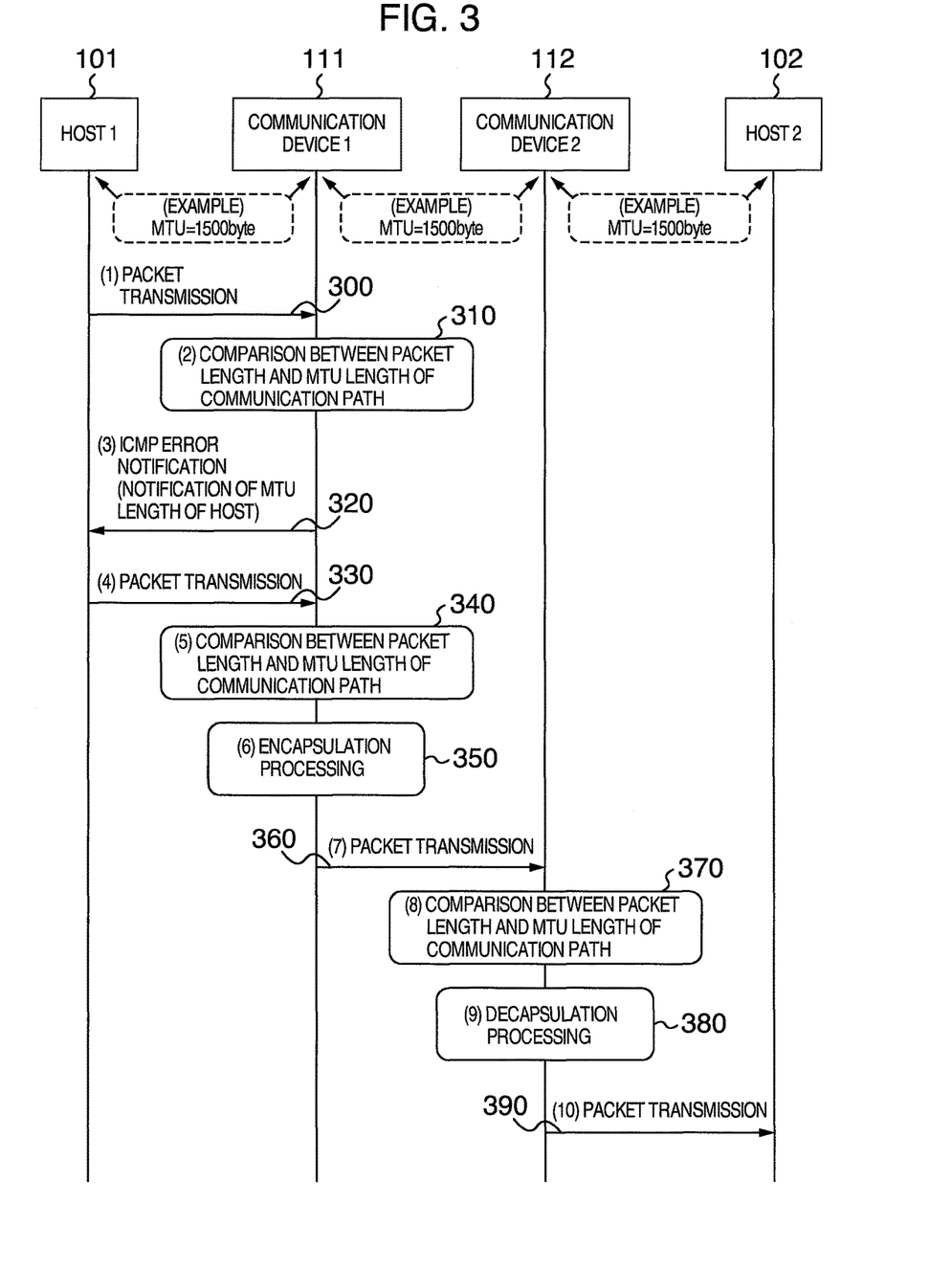
FIG. 3 is a sequence diagram illustrating processing of inter-host communication in an overlay network according to one embodiment of the present invention.

FIG. 3 is a sequence diagram for describing the processing of inter-host communication in the overlay network according to one embodiment of the present invention.

With reference to FIG. 3, a processing sequence of communication between the host 1 (101) and the host 2 (102) in the communication network of FIG. 1 will be described. The MTU length of each communication path of the host 1 (101), the communication device 1 (111), the communication device 2 (112), and the host 2 (102) is set to 1500 Byte as an example.

Figure 4:
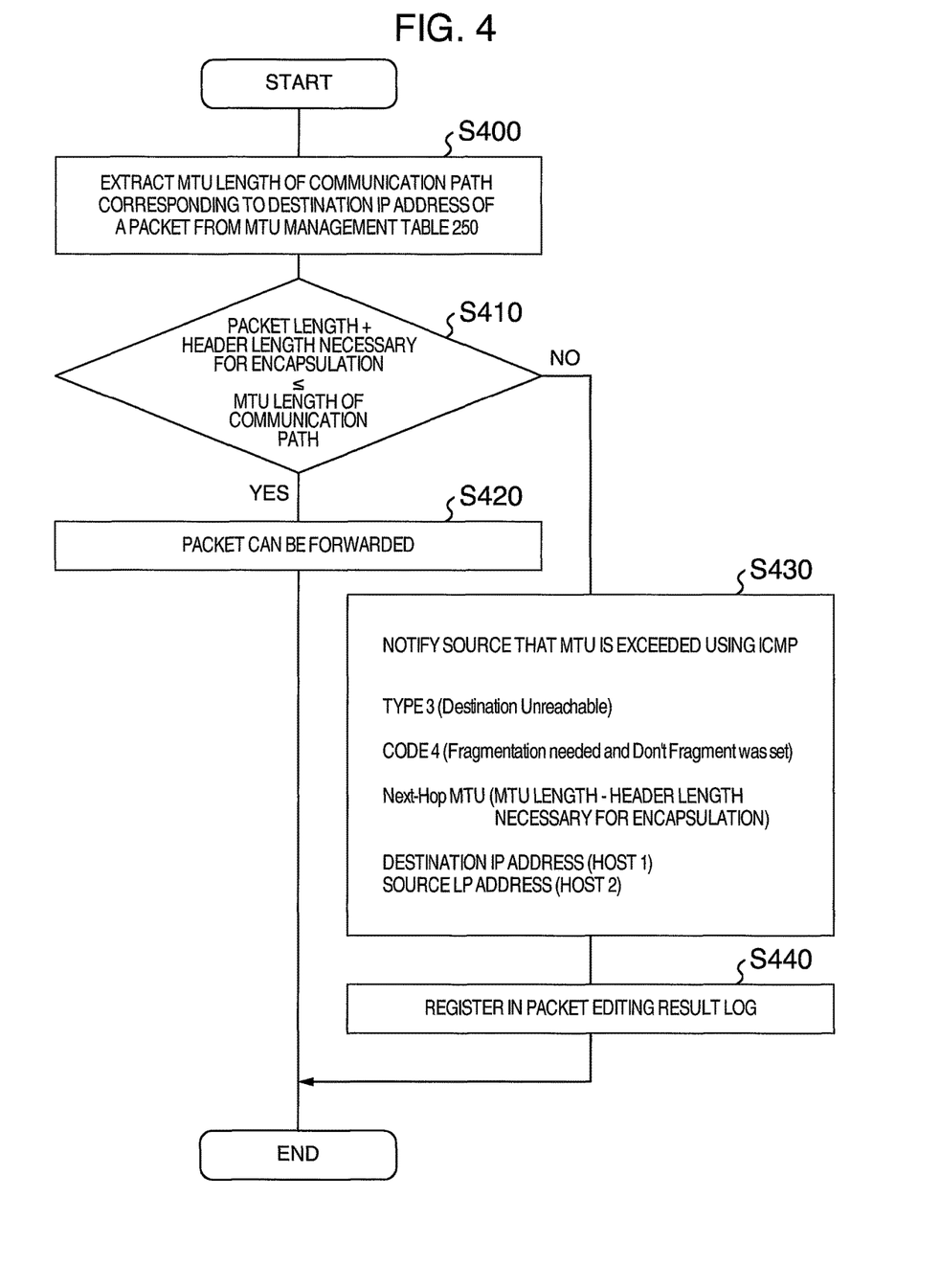
FIG. 4 is a flowchart illustrating processing by an MTU management unit of a communication device according to one embodiment of the present invention.

When the host 1 (101) forwards the packet to the host 2 (102), the packet is first transmitted to the communication device 1 (111) (300). The communication device 1 (111) refers to the MTU management table and compares the size obtained by adding the header length necessary for encapsulation to the packet length of the received packet with the MTU length of the communication path (310). As a result of the comparison, when the size obtained by adding the header length necessary for encapsulation to the packet length of the received packet is larger than the MTU length of the communication path, the communication device 1 (111) creates a message according to the format of the ICMP protocol, and notifies the host 1 (101) of an error message in which the MTU length to be satisfied by the transmission packet from the host 1 (101) is included (320). Details are shown in FIG. 4 and described later. The host 1 (101) adjusts the packet length to the MTU length to be satisfied by the transmission packet from the host 1 (101) extracted from the error message which the host 1 (101) has received, and retransmits the resultant packet to the communication device 1 (111) (330).

When the packet length of the packet which the communication device 1 (111) has received from the host 1 (101) does not exceed the MTU length of the communication path of the transmission destination of the packet (340), the communication device 1 (111) encapsulates the packet (350), and transmits the resultant packet to the communication device 2 (112) (360). As with the processing 310 and the processing 340, the communication device 2 (112) refers to the MTU management table, and compares the packet length of the packet received from the communication device 1 (111) via the communication path with the MTU length of the communication path of the packet (370). When the packet length does not exceed the MTU length of the communication path, the communication device 2 (112) deletes the information added by the encapsulation processing (350) (380), and transmits the packet to the host 2 (102) (390).

FIG. 4 is a flowchart describing the processing by the MTU management unit of the communication device in one embodiment of the present invention.

Referring to FIG. 4, the flow will be described in which the packet length after adding the header information to be added by the packet editing unit 210 to the received packet length, and the MTU length of the communication path in the MTU management unit 220 of the communication device 111 or the communication device 112 are compared, and when the packet length after adding the header information to be added by the packet editing unit 210 to the received packet length exceeds the MTU length of the communication path, the error notification by the packet editing unit 210 is processed.

The MTU management unit 220 first extracts the MTU length of the communication path corresponding to the destination IP address of the received packet from the MTU management table 250 shown in FIG. 7 (S400).

The MTU management unit 220 compares the size obtained by adding the header length necessary for encapsulation of the packet in the packet editing unit 210 to the packet length of the received packet with the extracted MTU length (S410), and when the size obtained by adding the header length to the packet length of the received packet is equal to or smaller than the MTU length of the extracted communication paths, the MTU management unit 220 determines that the packet can be forwarded with the packet intact (S420).

When the MTU management unit 220 determines that the size obtained by adding the header length to the packet length and of the received packet is larger than the MTU length of the extracted communication path, the packet editing unit 210 uses the format of ICMP protocol, and notifies the host 1 (101) of the error message. The packet editing unit 210 creates the following error message using the ICMP protocol format. First, 3 (Destination Unreachable) is set in the Type field of ICMP, and 4 (Fragmentation needed and Don't Fragment was set) is set in the Code field. In the Next-Hop MTU field, a packet obtained by subtracting the header length necessary for packet encapsulation in the packet editing unit 210 from the MTU length of the corresponding communication path stored in the MTU management table 250 of the communication device 1 (111) is determined and set as the MTU length to be satisfied by the host 1 (101) for notifying the host 1 (101).

Figure 6:
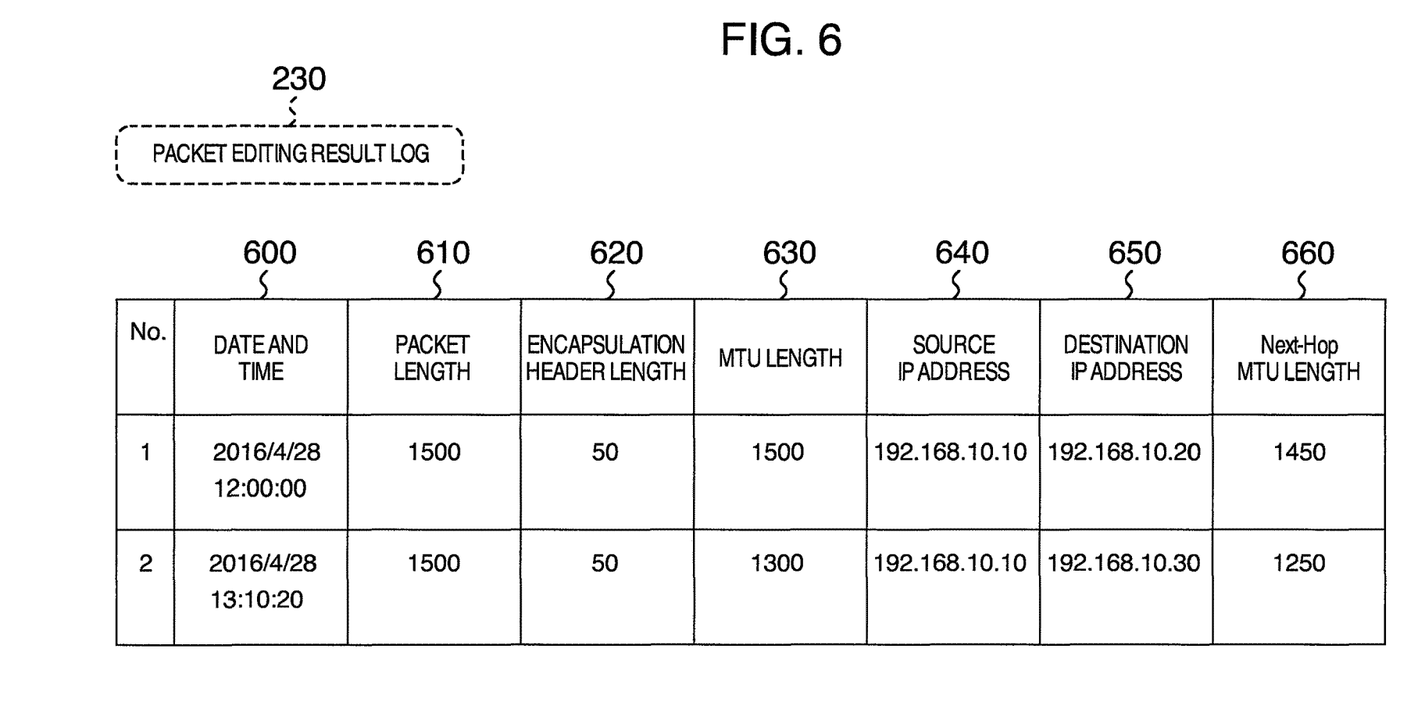
FIG. 6 is a diagram showing a packet editing result log according to one embodiment of the present invention.

The host 1 (101) determines, from the error message created by the packet editing unit (210) of the communication device 1 (111) using the ICMP protocol format, that the transmitted packet exceed the MTU length (the MTU length to satisfied by the transmission packet of the host 1 (101)), and can make a packet length which does not exceed the MTU length to satisfied by the transmission packet of the host 1 (101). In addition, since the packet editing unit 210 sets the IP address of the host 2 (102) in the source IP address field of the IP header of the error messages using the format of this ICMP protocol, the host 1 (101) judges as if it receives the notification from the host 2 (102). As a result, it possible to hide the communication device (111), which is in the middle of the path, so that the communication device (111) is not regarded as a device of layer 3 (S430). Finally, the packet editing unit 210 registers the content of the error message transmitted to the packet editing result log 230 (S440). Details of the Packet editing result log 230 are shown in FIG. 6 and will be described later.

Note that the MTU length in S400 in FIG. 4 can be obtained not by extracting the MTU length of the communication path corresponding to the destination IP address of the packet from MTU management table 250 but by setting the fixed value in advance. By setting the MTU length of the communication path with the fixed value, the processing of extracting the MTU length on the communication path becomes unnecessary. As a result, the processing efficiency of the communication device (111) is improved.

Figure 5:
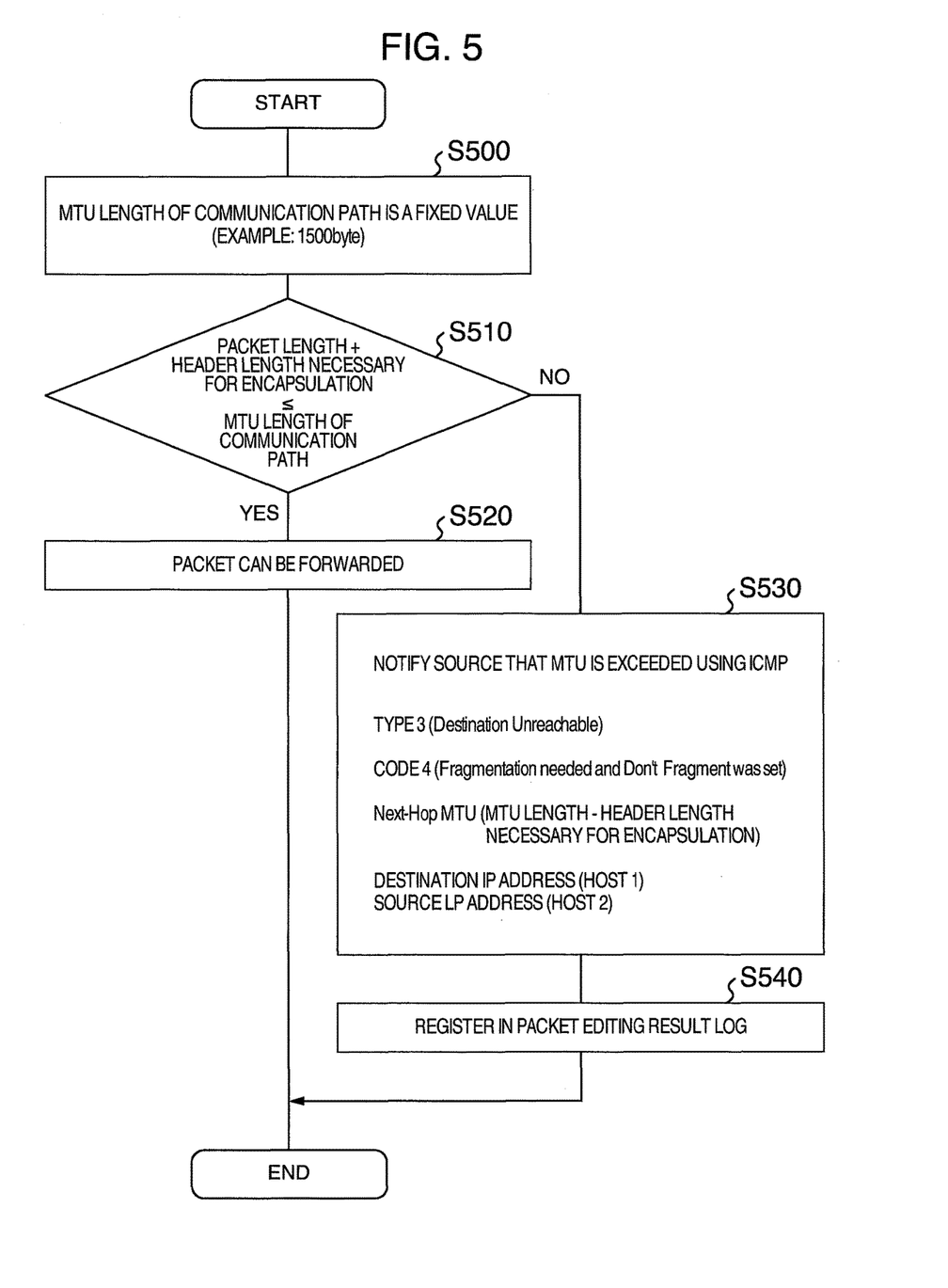
FIG. 5 is a flowchart illustrating processing by an MTU management unit of a communication device according to one embodiment of the present invention.

FIG. 5 is a flowchart describing the processing by the MTU management unit of the communication device in one embodiment of the present invention.

The processing flow in FIG. 5, in which the MTU length of the communication path is a fixed value, will be described.

The MTU length is set to a fixed value (S500). The fixed value may be set, for example, by the configuration of the communication device (111) or the like. The subsequent operations of S510 to S540 are the same as those of S410 to S440 of FIG. 4.

FIG. 6 is a diagram showing a packet editing result log according to one embodiment of the present invention.

With reference to FIG. 6, the configuration of the packet editing result log 230 will be described.

The date and time 600 is the date and time registered in the packet editing result log 230. The packet length 610 is the packet length of the packet transmitted to the communication device (111). The encapsulation header length 620 is the header length necessary for packet encapsulation. The MTU length 630 is the MTU length of the packet transmission destination path. The source IP address 640 is the source IP address set in S430 in FIG. 4. The destination IP address 650 is the destination IP address set in S430 in FIG. 4. Next-Hop MTU length 660 is the Next-Hop MTU length set in S430 of FIG. 4 (MTU length to be satisfied by transmission packet of the host). The above log information is registered. The log information can be used as information on cause analysis in cases where some defects occur on the network.

Effects of the above embodiments include the following.

Although a conventional technique for examining the minimum MTU on the communication path includes the Path MTU Discovery (RFC 1191) (hereinafter referred to as PMTUD). PMTUD cannot be used for the communication device in the layer 2 network of the overlay network. However, according to the present invention, with the above configuration, it is possible to notify the hosts of the MTU length to be satisfied by the packet which the hosts transmit.

Further, in the present invention, since not the MTU length itself of the communication path, but the MTU length in consideration of the additional portion of encapsulation header information for the tunnel is notified to the hosts as the MTU length to be satisfied by packets which the hosts transmits, it is possible to prevent fragments of the packet in the device.

When the MTU length is notified to the host, the source IP address of the packet is set to the IP address of the destination host. Thereby, without having the presence of the communication device which is in the middle path as seen from the host recognizable, while taking advantage of the benefits of an overlay method, the MTU length to be satisfied by the packet which the hosts transmit can be notified to the host.

Further, since the editing result of the packet is stored, it is possible to provide means for resolving problems when they occur.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A communication device in which communication between hosts of a layer 2 network is overlaid on a layer 3 network,
   wherein the communication device is a gateway device that transmits and receives packets,
   wherein the communication device manages a first MTU (Maximum Transmission Unit) length of each communication path with respect to a plurality of communication paths in the layer 3 network, determines a second MTU length based on information to be added in cases where communication between the hosts of the layer 2 network is overlaid via the plurality of communication paths,
   wherein in cases where, in the communication device, a packet length after adding the information to be added to a packet received from the hosts exceeds the first MTU length, the communication device notifies the hosts that transmitted the packet of the second MTU length with a message respectively having a source address set as a destination address of the packet and a destination address set as a source address of the packet,
   wherein the second MTU length is included in the message and the message is created based on ICMP (Internet Control Message Protocol) format, and
   wherein the first MTU length is a preset value.

2. The communication device according to claim 1, wherein the second MTU length is a value obtained by subtracting the information to be added from the first MTU length.

3. The communication device according to claim 1, wherein the communication device updates the first MTU length upon receiving information on the first MTU length via the layer 3 network.

4. A communication method executed by a gateway device that transmits and receives packets, in which communication between hosts of a layer 2 network is overlaid on a layer 3 network, the communication method executed by the communication device comprising:
   managing a first MTU (Maximum Transmission Unit) length of each communication path with respect to a plurality of communication paths in the layer 3 network;
   determining a second MTU length based on information to be added in cases where communication between the hosts of the layer 2 network is overlaid via the plurality of communication paths; and
   in cases where a packet length after adding the information to be added to a packet received from the hosts exceeds the first MTU length, notifying the hosts that transmitted the packet of the second MTU length with a message respectively having a source address set as a destination address of the packet and a destination address set as a source address of the packet
   wherein the second MTU length is included in the message and the message is created based on ICMP (Internet Control Message Protocol) format, and
   wherein the first MTU length is a preset value.

5. The communication method according to claim 4, wherein the second MTU length is a value obtained by subtracting the information to be added from the first MTU length.

6. The communication method according to claim 4, wherein when information on the first MTU length is received via the layer 3 network 130, the first MTU length is updated.

* * * * *